July 19, 1938. E. P. HURD 2,124,035
LOCKING DEVICE FOR VEHICLE WHEELS
Original Filed Aug. 5, 1935
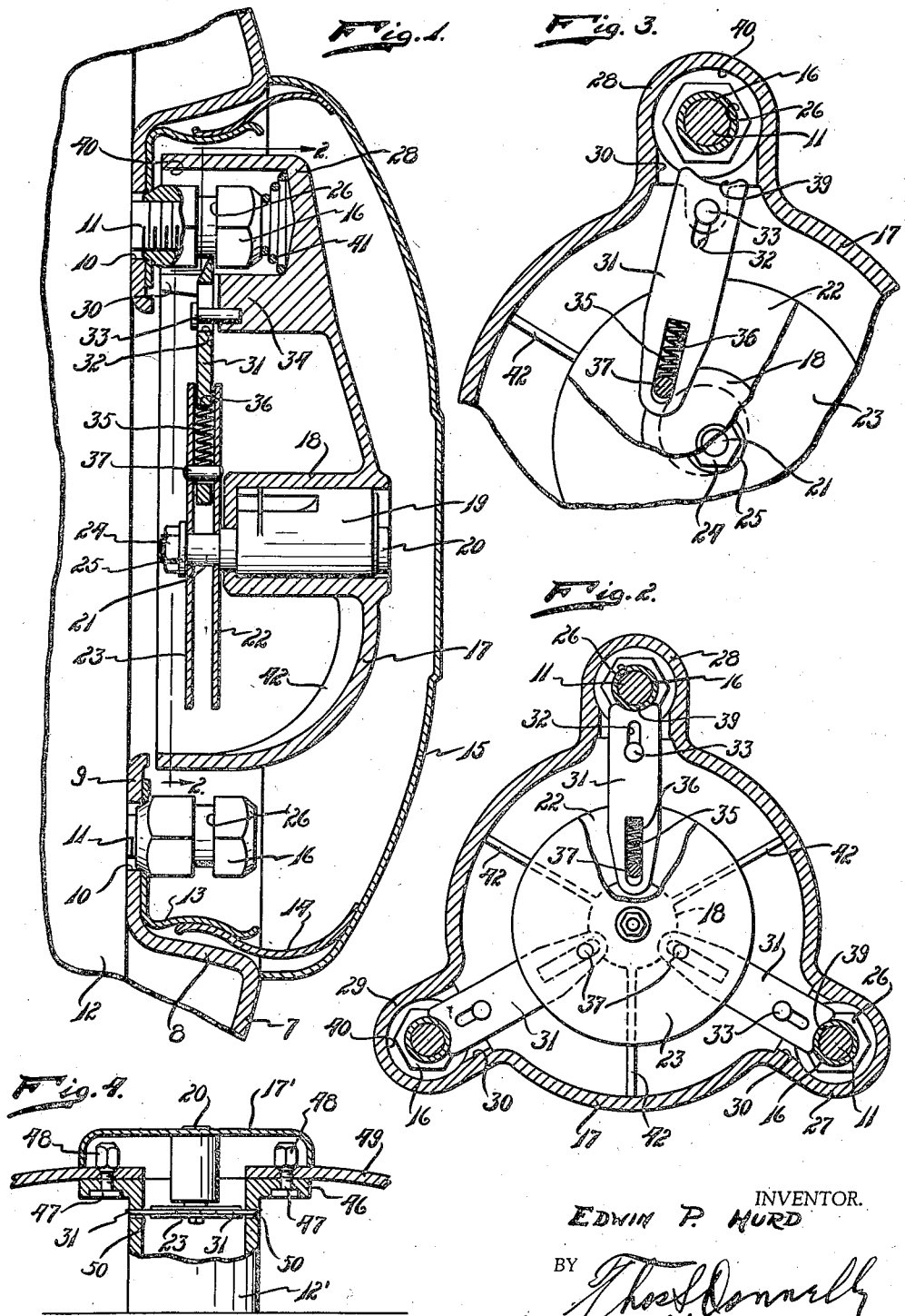
INVENTOR.
EDWIN P. HURD
BY *Thos. A. Donnelly*
ATTORNEY.

UNITED STATES PATENT OFFICE 2,124,035

LOCKING DEVICE FOR VEHICLE WHEELS

Edwin P. Hurd, Detroit, Mich.

Application August 5, 1935, Serial No. 34,648
Renewed March 22, 1938

11 Claims. (Cl. 70—169)

My invention relates to a new and useful improvement in a locking device for vehicle wheels adapted for use primarily for vehicle wheels having an open-face hub into which projects supporting bolts or studs and on which are threaded nuts or other suitable securing means. In the construction of vehicle wheels in which the open-face hub is provided, the outer face of the hub is generally enclosed by a removable hub cap. Under the present type of construction, this hub cap is held on by snap-engaging springs so that in order to remove the wheel from its supporting body it is but necessary to remove the hub cap whereupon access is provided to the nuts which serve to secure the wheel in position.

It is an object of the present invention to provide means whereby, when the hub cap is removed, the nuts threaded on the supporting studs or bolts cannot be removed unless the present mechanism is first removed. To do this would require a key so that protection is thus afforded to the user of a vehicle and a means provided which prevents theft of vehicle wheels. This is also effected by a device which is invisible when the wheel is in normal operation or position, that is, when the hub cap is in covering position.

In addition to the objects named above it is also an object of the present invention to provide a device of this class in which the balance of the wheel cannot be disturbed when the device is mounted thereon.

Another object of the invention is the provision of a device of this class which will be simple in structure, economical of manufacture, durable, highly efficient in use, compact, light and easily and quickly mounted in position and removed therefrom.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central, vertical, sectional view of the invention showing it applied.

Fig. 2 is a sectional view taken on line 2—2 of Fig. 1 with parts broken away.

Fig. 3 is a fragmentary enlarged sectional view similar to Fig. 2 showing the locking finger removed.

Fig. 4 is a fragmentary sectional view showing another form of mounting with which the invention may be used.

In Fig. 1 I have shown a fragment of a vehicle wheel having the hub 8 which is open at its outer end and provided at its inner side with the inwardly directed flange 9 in which are formed openings 10 and through which studs 11 project. These studs 11 extend outwardly from the supporting body 12 on which it is desired to mount the vehicle wheel. Welded or otherwise suitably secured to the flange 11 are spring clips 13 which inter-engage with the tongues 14 punched from the hub cap 15. Threaded on the studs 11 are nuts 16 which serve to secure the wheel in position. In order to obtain access to the nut 16, it is but necessary to pry the hub cap 15 out of position.

The invention comprises a cup-shaped housing 15 or supporting member 17 carrying at adjacent its center the inwardly projecting housing 18 which forms a bearing for the lock barrel 19 in which is rotatably mounted the key plug 20. This key plug carries the flat faced stud 21 which projects outwardly from the inner side thereof and extends through the pair of spaced disks 22 and 23, each of these spaced disks having a flat edged opening formed therethrough so that a rotation of the stud will effect a rotation of the disks 22 and 23. A nut 24 and a washer 25 are mounted on the stud. Formed in some of the nuts 16 is a peripheral groove 26. The housing 17 is provided with outward projections 27, 28 and 29, each of which is cup-shaped and serves to form an enclosing housing for one of the nuts 16 which is provided with the peripheral groove 26. A passageway 30 is formed into each of the projections 27, 28 and 29 from the inner side thereof adjacent the open end. Slidable through each of these passages is a locking finger 31 which is provided with a slot 32 in which engages the pin 33 which is driven into the face of a boss 34 built up on the inner side of the body of the housing 17. In each of these locking fingers 31, adjacent its inner end, is formed a slot 35 in which engages a pin 37 which projects through the plates 22 and 23. Positioned in the slot 35 is a spring 38, one end of which engages an end of the slot 35 and the other end of which engages against the pin 37. It will be noted that the plates 22 and 23 project radially outwardly beyond the outer end of the slot 35 so that this slot is always covered and thereby a disengagement of the spring 38 from the slot is prevented. The outer ends of the locking fingers 31 are formed arcuate as at 39 to conform with the curvature of the nut. It will be noted that these locking fingers are of such a thickness that they will enter the groove 26.

By rotating the key plug 20 the locking fingers may be moved to the position shown in Fig. 1 and Fig. 2 or into the position shown in Fig. 3. The position shown in Fig. 1 and Fig. 2 may be termed the locking position and the position shown in Fig. 3 may be termed the unlocked position.

When the wheel is mounted in position and the nuts are threaded down tight, the housing 17 may be positioned within the hub as shown in Fig. 1 so that, in the form shown, three of the nuts which bear the peripheral grooves 26 will be enclosed in the cup-shaped housing 40, a spring 41 being mounted in the base of each of these cup-shaped houses. When placed in position while the locking fingers 31 are in the position shown in Fig. 3, a rotation of the key plug will effect a movement of the locking fingers of the engagement in the peripheral grooves 26 as shown in Fig. 1 and Fig. 3. When in this position, the housing 17 cannot be removed and the locking fingers 31 cannot be retracted without a rotation of the key plug 20 which would require the use of the properly fitting key. When the housing 17 is locked in position, the hub cap 15 may be mounted in the usual manner. It will thus be noted that I have provided a means for preventing access to the nuts for securing the wheel on its supporting body while at the same time the outward appearance of the wheel when in use is in no manner effected. It will also be noted that the projections are balanced around the center of the housing so that the balance of the wheel is not effected.

Reinforcing ribs 42 are mounted on the inner face of the housing 17.

It is believed to appear obvious that the number of nuts 27, 28 and 29 may be increased to any desired number so as to cover a different number of nuts than the number indicated.

In Fig. 4 I have shown a supporting member 12' which is of a type commonly used as a spare wheel carrier. This member 12' is a tube which projects outwardly from a suitable support and is provided on its outer end with the peripheral flange 46 to which may be secured bolts 47 provided with nuts 48. The bolts project through the wheel hub 49, thus locking the wheel on the tube 12'. The cover 17' is of the type of structure already described and the locking fingers 31 are similarly constructed and operated, excepting that these fingers, when in locking position, are projected through openings 50 formed in the member 12'. The housing or cover 17' serves to cover the nuts 48 which, of course, would not have to be provided with peripheral grooves.

The slots 35 and the springs 38 may be of such length that the locking fingers 31 may be forced backwardly against the compression of the spring into unlocking position. These springs and slots, however, may be so shortened that when the locking fingers 31 are forcibly pushed backwardly to completely compress the spring, the locking finger would still remain in locking position, thus necessitating the use of the key for rotating the locking finger off of center in order to further retract it.

While I have illustrated and described the preferred form of construction, I do not wish to limit myself to the precise details of structure shown, but desire to avail myself of such variations and modifications as come within the scope of the appended claims.

Having thus described my invention, what I claim as new and desire to secure by Letters Patent is:

1. In combination with a vehicle wheel having an open-faced hub and provided with openings through which a plurality of threaded studs project into said hub: a nut threaded on each of said studs, each of said nuts having its periphery hollowed out; a cup-shaped supporting member for embracing a plurality of said studs and nuts; a plurality of radially moveable locking members projectable into engagement in the hollowed out portions of said nuts for securing said supporting member in position and preventing access to said nuts; and key-operated means carried by said supporting member for moving said locking fingers into said hollowed out portions.

2. In combination with a vehicle wheel having an open-faced hub and provided with openings through which studs may be projected for securing the wheel on a supporting body: a nut threaded on each of said studs, each of said nuts having a recess formed in its periphery; a cup-shaped cover positioned in said hub and embracing a plurality of said nuts; locking means carried by said cover and projectable into said recesses for locking said cover on said studs; and key-operated means carried by said cover and moving said locking means into locked and unlocked position.

3. In combination with a vehicle wheel having an open-faced hub provided with openings through which studs may project for securing said wheel to a supporting structure: a nut threaded on each of said studs; a cover positioned within said hub and overlying a plurality of said studs for concealing the nuts threaded thereon and rendering the same inaccessible; locking means carried by said cover and engageable with said nuts for locking said cover in position; and key-operated means for operating said locking means.

4. In combination with a vehicle wheel having an open-faced hub provided with openings through which studs may project for securing said wheel to a supporting body, a nut carried on each of said studs and having a peripheral groove formed therein; a cover positioned within said hub and covering a plurality of said nuts and rendering the same inaccessible; locking fingers carried by said cover and projectable into said grooves for securing said cover in covering position; means for moving said locking fingers into locking and unlocking position; and key-operated means for actuating said moving means.

5. In combination with a vehicle wheel having an open-faced hub provided with openings through which studs may project for securing said wheel in a supporting body, a nut threaded on each of said studs and having a peripheral groove formed therein; a cover positioned within said hub and adapted for covering a plurality of said nuts; a centrally located bearing member on said cover; a rotatable key-operated member mounted in said bearing member; a pair of spaced disks; means projecting outwardly from said rotatable member and engaging said disks for rotating the same upon rotation of said rotatable member; and a plurality of locking fingers each engageable in the groove of one of said nuts and projectable into said groove and retractable therefrom upon the rotation of said disks dependent upon the direction of said rotation.

6. A device of the class described, comprising: a cover; a plurality of radially movable locking fingers carried by said cover; a rotatable locking member; a stud projecting outwardly from said locking member; a pair of spaced plates, said stud projecting through said plates and adapted upon rotation for effecting rotation of said plates; and yieldable means for connecting one end of said locking fingers to and between said plates.

7. In combination with a vehicle wheel having a plurality of threaded members for securing the same to a supporting body: a cup-shaped supporting member for embracing a plurality of said threaded members and preventing access to the same; a plurality of locking members movable into engagement and out of engagement with said threaded members and adapted upon movement into engagement and out of engagement with said threaded members for locking said cup-shaped supporting member in covering position relatively thereto; and key-operated means carried by said cup-shaped supporting member for moving said locking members into and out of engagement with said threaded members.

8. In combination with a vehicle wheel having a plurality of threaded members for securing the same to a supporting body: a cup-shaped supporting member for embracing a plurality of said threaded members and preventing access to the same; a plurality of locking members movable into engagement with said threaded members and adapted upon movement into engagement with said threaded members for locking said cup-shaped supporting member in covering position relatively thereto; and key-operated means carried by said cup-shaped supporting member for moving said locking members into engagement with said threaded members.

9. In combination with a vehicle wheel having an open-faced hub provided with openings for cooperating with threaded members for securing said wheel to a supporting structure: a plurality of threaded members for securing said wheel to a supporting structure; a cover positioned within said hub and overlying a plurality of threaded member for concealing the same and rendering them inaccessible; locking means carried by said cover and engageable with said threaded members for locking said cover in position; and key-operated means for operating said locking means.

10. In combination with a vehicle wheel having an open-faced hub provided with openings for cooperating with threaded members for securing said wheel to a supporting structure: a plurality of threaded members projecting through said openings for securing said wheel to a supporting structure and terminating within said hub; a cover positioned within said hub and overlying a plurality of said threaded members for concealing the same and rendering the same inaccessible; locking means carried by said cover for locking said cover in position; and key-operated means for operating said locking means, said cover lying within said hub and leaving the outer end of said hub open.

11. An anti-theft cover for a vehicle wheel adapted to enclose a plurality of means for fastening the wheel to an element and thereby render these means inaccessible comprising a cover applied to said wheel so as to inclose and thereby render inaccessible said fastening means, a key-operated lock mechanism carried by said cover and engageable with said fastening means to secure said cover in position on said wheel, and a spring arm mounted within said cover adjacent to said lock mechanism and adapted to yieldingly press against said fastening means thereby to assist in holding said cover in position.

EDWIN P. HURD.